United States Patent
Lynch

(10) Patent No.: US 8,291,501 B2
(45) Date of Patent: Oct. 16, 2012

(54) VALIDATION OF PROTECTED INTRA-SYSTEM INTERCONNECTS FOR DIGITAL RIGHTS MANAGEMENT IN ELECTRICAL COMPUTERS AND DIGITAL DATA PROCESSING SYSTEMS

(75) Inventor: Thomas W. Lynch, Austin, TX (US)

(73) Assignee: Cheng Holdings, LLC, Wilmington (DE)

( * ) Notice: Subject to any disclaimer, the term of this patent is extended or adjusted under 35 U.S.C. 154(b) by 1092 days.

(21) Appl. No.: 12/028,669

(22) Filed: Feb. 8, 2008

(65) Prior Publication Data

US 2009/0205048 A1 Aug. 13, 2009

(51) Int. Cl.
*G06F 21/00* (2006.01)

(52) U.S. Cl. .......... 726/26; 716/126; 716/136; 713/150; 713/153; 713/154; 726/1

(58) Field of Classification Search ................ 726/26, 726/27
See application file for complete search history.

(56) References Cited

U.S. PATENT DOCUMENTS

| | | | | |
|---|---|---|---|---|
| 5,596,718 | A | * | 1/1997 | Boebert et al. ............ 726/16 |
| 5,898,705 | A | * | 4/1999 | Graef ...................... 714/738 |
| 6,246,254 | B1 | * | 6/2001 | Choukalos et al. ........... 326/8 |
| 6,681,213 | B2 | * | 1/2004 | Fujimori ................... 705/57 |
| 6,732,273 | B1 | * | 5/2004 | Byers ...................... 713/193 |
| 7,218,567 | B1 | * | 5/2007 | Trimberger et al. ........ 365/228 |
| 7,296,296 | B2 | * | 11/2007 | Dunbar et al. ............. 726/26 |
| 7,634,447 | B2 | | 12/2009 | Kim et al. |
| 2002/0083318 | A1 | * | 6/2002 | Larose ..................... 713/164 |
| 2002/0099955 | A1 | * | 7/2002 | Peled et al. ............... 713/200 |
| 2003/0097644 | A1 | * | 5/2003 | Hong ......................... 716/2 |
| 2003/0226029 | A1 | * | 12/2003 | Porter et al. .............. 713/200 |
| 2003/0236978 | A1 | * | 12/2003 | Evans et al. ............... 713/164 |
| 2004/0024931 | A1 | | 2/2004 | Lam et al. |
| 2004/0250055 | A1 | | 12/2004 | Flanigan |
| 2005/0091488 | A1 | * | 4/2005 | Dunbar et al. ............. 713/165 |
| 2005/0160053 | A1 | | 7/2005 | Okamoto et al. |
| 2005/0204163 | A1 | | 9/2005 | Alkove et al. |
| 2005/0204289 | A1 | | 9/2005 | Mohammed et al. |
| 2005/0240985 | A1 | * | 10/2005 | Alkove et al. ................ 726/1 |
| 2006/0123377 | A1 | * | 6/2006 | Schultz et al. ............. 716/11 |

(Continued)

FOREIGN PATENT DOCUMENTS

WO    WO 2006074527    *    7/2006

OTHER PUBLICATIONS

Di and Jess, "An Efficient CMOS Bridging Fault Simulator: With SPICE Accuracy", Sep. 1996, IEEE Transactions on Computer-Aided Design of Integrated Circuits, vol. 15 No. 9, pp. 1071-1080.*

*Primary Examiner* — Brandon Hoffman
*Assistant Examiner* — Thomas C Lauzon
(74) *Attorney, Agent, or Firm* — Dorsey & Whitney LLP

(57) ABSTRACT

Embodiments for validating protected data paths for digital rights management of digital objects are disclosed. Some embodiments disclosed herein may comprise processes or apparatus for transferring data from one or more peripherals to one or more computers or digital data processing systems for the latter to process, store, and/or further transfer and/or for transferring data from the computers or digital data processing systems to the peripherals. Some embodiments disclosed herein may comprise processes or apparatus for interconnecting or communicating between two or more components connected to an interconnection medium within a single computer or digital data processing system.

26 Claims, 10 Drawing Sheets

U.S. PATENT DOCUMENTS

| | | |
|---|---|---|
| 2006/0137028 A1 | 6/2006 | Evans et al. |
| 2006/0149918 A1* | 7/2006 | Rudelic et al. ............... 711/202 |
| 2006/0272022 A1* | 11/2006 | Loukianov et al. ............ 726/26 |
| 2006/0294009 A1* | 12/2006 | Kim et al. ...................... 705/50 |
| 2007/0100771 A1* | 5/2007 | Eckleder et al. ............... 705/67 |
| 2007/0276958 A1* | 11/2007 | Curtis et al. .................. 709/238 |
| 2008/0168255 A1* | 7/2008 | Abou-Emara et al. ......... 712/28 |
| 2008/0240230 A1 | 10/2008 | Oxman et al. |
| 2008/0271152 A1 | 10/2008 | Lynch |
| 2009/0126027 A1* | 5/2009 | Lynch ............................ 726/29 |

* cited by examiner

VALIDATION OF PROTECTED INTRA-SYSTEM INTERCONNECTS FOR DIGITAL RIGHTS MANAGEMENT IN ELECTRICAL COMPUTERS AND DIGITAL DATA PROCESSING SYSTEMS

FIELD

The subject matter disclosed herein relates to the validation of protected data paths within electrical computers and digital data processing systems for digital rights management. Subject matter disclosed herein may relate to processes or apparatus for transferring data from one or more peripherals to one or more computers or digital data processing systems for the latter to process, store, and/or further transfer and/or for transferring data from the computers or digital data processing systems to the peripherals. Subject matter disclosed herein may relate to processes or apparatus for interconnecting or communicating between two or more components connected to an interconnection medium within a single computer or digital data processing system.

BACKGROUND

Today, when media content such as an audio compact disk (CD) or Digital Video Disk (DVD) is played on a computing platform, a media player application is executed on a central processing unit (CPU) to listen to and/or view the media content. Because the media content is accessible to application programs, and further because the digital media content can be easily copied and/or otherwise distributed without a loss in quality, copyright holders such as movie studios and record labels are concerned about protecting their copyrighted material.

In order to protect copyrighted material, distributors of copyrighted material often utilize digital rights management (DRM) schemes such as, for example, CSS (content scrambling system), as employed on DVDs, and AACS (advanced access content system), as employed on Blu-Ray disks. Such schemes may employ encryption technologies to prevent access to copyrighted material without a license. However, because the media player is implemented in software, these schemes are prone to being broken by individuals seeking to circumvent the DRM schemes. Once the scheme has been broken, it is possible to widely distribute, perhaps via the Internet, a program that will allow free access (without a license) to the copyrighted material.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference to the following detailed description if read with the accompanying drawings in which:

DETAILED DESCRIPTION

Figure 1:
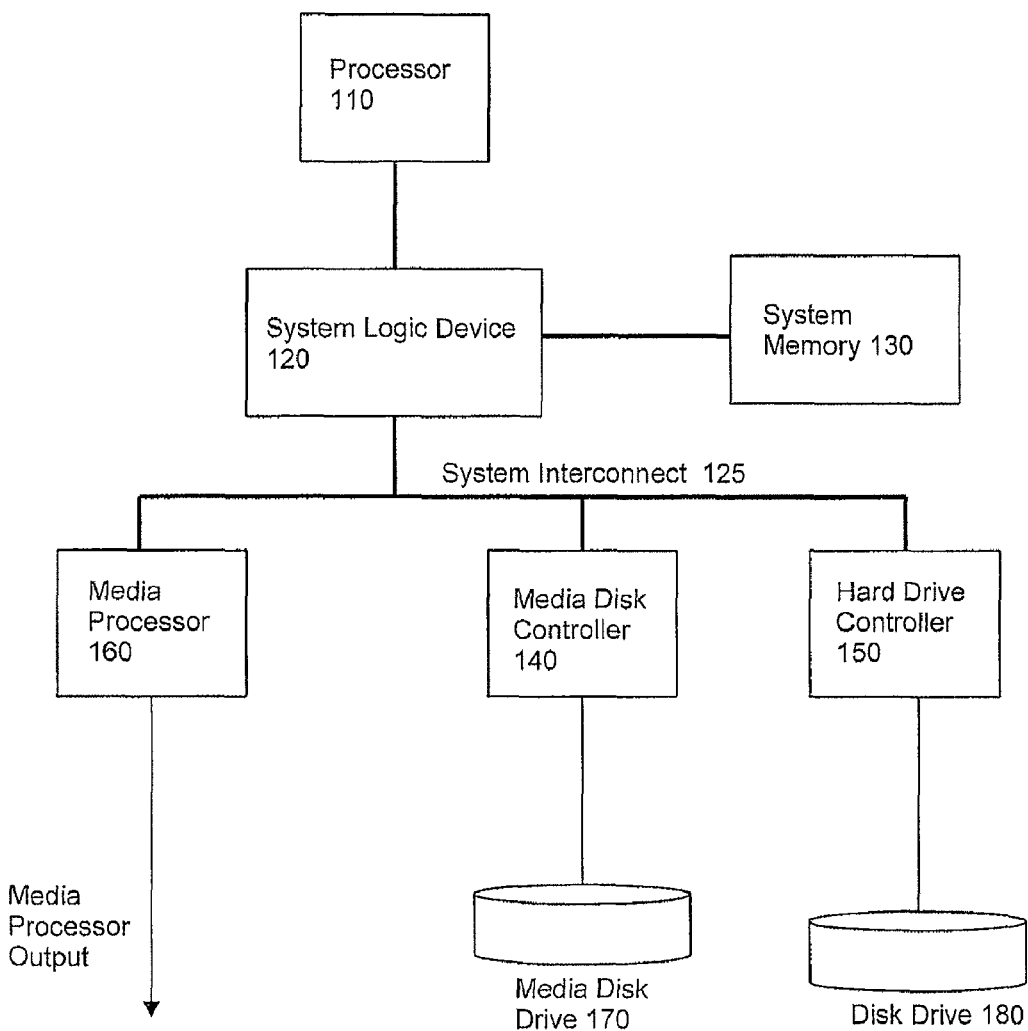
FIG. 1 is a block diagram of an example embodiment of a computing platform.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as to not obscure claimed subject matter.

Some portions of the detailed description that follows are presented in terms of algorithms, programs and/or symbolic representations of operations on data bits or binary digital signals within a computer memory, for example. These algorithmic descriptions and/or representations may include techniques used in the data processing arts to convey the arrangement of a computer system and/or other information handling system to operate according to such programs, algorithms, and/or symbolic representations of operations.

An algorithm may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities.

Unless specifically stated otherwise, as apparent from the following discussion, it is appreciated that throughout this specification a computing platform includes, but is not limited to, a device such as a computer or similar electronic computing device, that manipulates and/or transforms data represented as physical, electronic and/or magnetic quantities and/or other physical quantities within the computing platform's processors, memories, registers, and/or other information storage, transmission, reception and/or display devices. Accordingly, a computing platform refers to a system, a device, and/or logical construct that includes the ability to process and/or store data in the form of signals. Thus, a computing platform, in this context, may comprise hardware, software, firmware and/or any combination thereof. Where it is described that a user instruct a computing platform to perform a certain action it is understood that instruct may mean to direct or cause to perform a task as a result of a selection or action by a user. A user may, for example, instruct a computing platform to embark upon a course of action via an indication of a selection, including, for example, pushing a key, clicking a mouse, maneuvering a pointer, touching a touch screen, and/or be audible sounds. A user may include an end-user. Examples of computing platforms may include, but are not limited by, personal computers, personal digital assistants, cellular phones, laptop computers, notebook computers, televisions, set-top devices, DVD (digital video disc) players, Blu-Ray disc players, etc.

Flowcharts, also referred to as flow diagrams by some, are used in one or more figures herein to illustrate certain aspects of some embodiments. Logic they illustrate is not intended to be exhaustive of any, all, or even most possibilities. Their purpose is to help facilitate an understanding of this disclosure with regard to the particular matters disclosed herein. To this end, many well known techniques and design choices are not repeated herein so as not to obscure the teachings of this disclosure.

Embodiments claimed may include apparatuses for performing the operations herein. This apparatus may be specially constructed for the desired purposes, or it may comprise a general purpose computing device selectively activated and/or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and/or programmable read only memories (EEPROMs), flash memory, magnetic and/or optical cards, and/or any other type of media suitable for storing electronic instructions, and/or capable of being coupled to a system bus for a computing device and/or other information handling system.

The processes and/or displays presented herein are not inherently related to any particular computing device and/or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments are not described with reference to any particular programming language. It will be appreciated that a variety of programming languages may be used to implement the teachings described herein.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other.

Reference throughout this specification to one embodiment or an embodiment means that a particular feature, structure, or characteristic described in connection with the embodiment is included in at least one embodiment. Thus, the appearances of the phrase in one embodiment or an embodiment in various places throughout this specification are not necessarily all referring to the same embodiment. Furthermore, the particular features, structures, or characteristics may be combined in one or more embodiments.

Instructions as referred to herein relate to expressions which represent one or more logical operations. For example, instructions may be machine-readable by being interpretable by a machine for executing one or more operations on one or more data objects. However, this is merely an example of instructions, and the scope of claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. However, these are merely examples of an instruction, and the scope of the claimed subject matter is not limited in this respect.

Storage medium as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. However, these are merely examples of a storage medium, and the scope of the claimed subject matter is not limited in this respect.

Logic as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA), for example. Also, logic may comprise machine-readable instructions stored in a storage medium in combination with processing circuitry to execute such machine-readable instructions. However, these are merely examples of structures which may provide logic, and the scope of the claimed subject matter is not limited in this respect.

A digital object as referred to herein relates to information that is organized and/or formatted in a digitized form. For example, a digital object may comprise one or more documents, visual media and/or audio media, and/or combinations thereof. Examples of digital objects may include movies and music, as well as electronic books. However, these are merely examples of the types of information that may be maintained in a digital object, and the scope of claimed subject matter is not limited in this respect. Such a digital object may be maintained in a compressed format to enable efficient storage of the digital object in a storage medium and/or transmission of the digital in a data transmission network. In other embodiments, such a digital object may be encrypted. Digital objects may be distributed via disc or other media, or may be distributed via a network such as the Internet. However, these are merely examples of digital objects, and the scope of the claimed subject matter is not limited in these respects.

As pointed out above, difficulties with state of the art technology, particularly in the area of digital rights management of digital objects, may include susceptibility to the breaking of DRM schemes and to the resulting unlicensed copying of copyrighted media content. A need, therefore, exists for techniques and/or devices and/or systems that may prevent unauthorized access to copyrighted media content.

FIG. 1 is a block diagram of an example conventional computing platform 100. Computing platform 100 for this example comprises a processor 110, a system logic device 120, and a system memory 130. Also included are a hard drive controller 150, a media disk controller 140, and a media processor 160. For this example, media processor 160, media disk controller 140, and hard drive controller 150 are coupled to system logic device 120, and by extension to the rest of the system including processor 110, via a system interconnect 125. System interconnect 125 may comprise a bus such as, for example, a PCI (Peripheral Component Interconnect) Express bus.

Media disk controller 140 for this example is coupled to a media disk drive 170, and hard drive controller 150 is coupled to a disk drive 180. For this example, media disk drive 170 may comprise an optical disk drive, for example a CD drive, and media disk controller 140 may comprise an optical disk controller. Also for this example, media processor 160 may comprise an audio output device. For other examples, media processor 160 may comprise a graphics controller or other type of processor.

To illustrate at least one of the disadvantages inherent in a conventional computing platform, consider the situation if an audio CD is inserted into media disk drive 170. In response to the audio CD being inserted into media disk drive 170, an application may be launched and executed by processor 110 to play the audio media. Audio data files are transferred from media disk controller 140 to one or more elements of the platform 100, including media processor 160. Media processor 160 may provide an analog audio output to one or more speakers or to additional audio processing equipment. In processing the audio data, the audio data is made available to processor 110 as well as to other platform resources via system interconnect 125. Further, it is possible for other software applications to gain access to the audio content. At some point in playing the audio CD, independent of any encoding method used and/or encryption scheme employed and/or independent of any transactions with a third party for permission or payment, etc., there will be a point during the playing process when the audio data must be sent as a series of samples to a digital-analog (D/A) converter. The input to the D/A converter is a decoded form of the music, and thus it may be copied any number of times without loss of quality and without anyone's permission. The same type of issue may be present in the case of video data, for example from a DVD, that must eventually be reduced to decoded pixel values. In general, any media content will be eventually sent to a rendering device, and the input to the rendering device, such as media processor 160 in the current example, may represent decoded media that may be copied without restriction.

Figure 2:
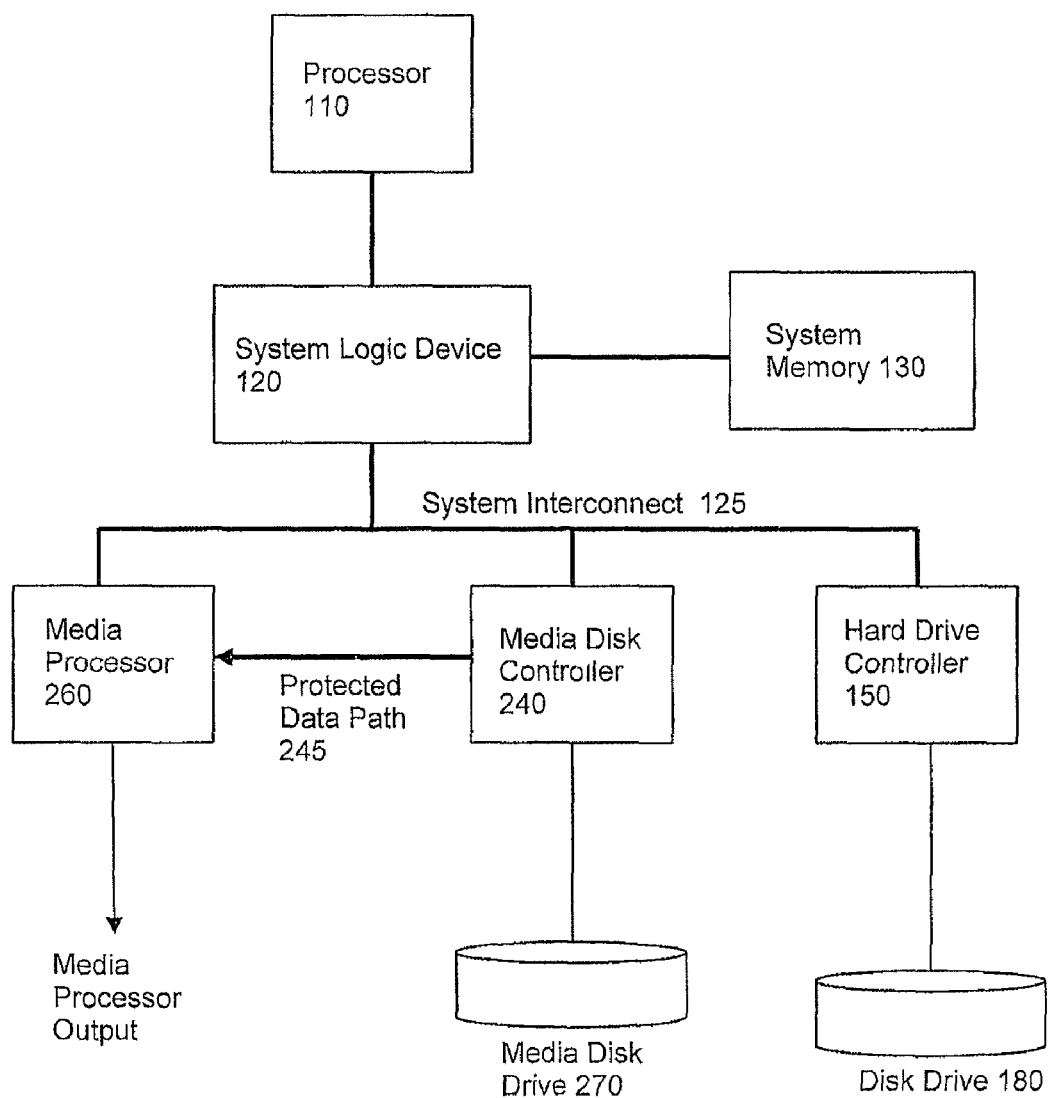
FIG. 2 is a block diagram of an example embodiment of a computing platform comprising an example embodiment of a protected data path.

FIG. 2 is a block diagram of an example embodiment of a computing platform 200 comprising an example embodiment of a protected data path 245 coupling a media disk controller 240 and a media processor 260. Platform 200 also comprises processor 110, system logic device 120, and system memory 130, as well as disk drive 180 and hard drive controller 150. For this example embodiment, media processor 260, media disk controller 240, and hard drive controller 150 are coupled to system logic device 120 via system interconnect 125. Platform 200 also may comprise a media disk drive 270.

For this example embodiment, media disk drive 270 may comprise a CD drive. Also for this example embodiment, the contents of the CD that may be inserted into media disk drive 270 may have a format that conventional CD drives cannot read. This may prevent the CD from being placed into a conventional player and/or computing platform and being copied. For this example embodiment, media disk drive 270 may be adapted to be able to read the contents of the CD. In an alternative embodiment, a special device driver may be utilized to permit reading of the contents of the CD with a conventional disk drive.

For the current example embodiment, if a CD is placed into the media disk drive 270, the media disk drive may be instructed to read the contents of the disk. For this example, the contents of the CD comprise a digital object including audio information. For this example, the audio information is delivered from media disk drive 270 to media disk controller 240. However, instead of passing along the audio information to system interconnect 125, as would be the case with a conventional computing platform, the audio information is delivered to media processor 260 via protected data path 245. For one embodiment, information may be encrypted before transmission across protected data path 245. However, other embodiments may not encrypt information prior to transmission across protected data path 245. Encrypting data on protected data path 245 may have the advantage of preventing anyone from gathering usable information by attaching a logic analyzer or other device to the exposed data path.

Media processor 260 for this example may comprise audio processing circuitry including a D/A converter, and may output an analog audio signal via a media processor output. Also, for this example embodiment, the audio content is not delivered to system interconnect 125, and access requests received over system interconnect 125 at media disk controller 240 and/or media processor 260 are not allowed in order to prevent other system resources, such as, for example, processor 110, from gaining access to the audio information.

For an embodiment, a digital object may include both protected and unprotected information. For example, an audio object may include the actual audio information as protected information and may also include other information, such as, for example, title and/or author information, as non-protected information. Non-protected information for an embodiment may be allowed to be transferred over system interconnect 125. Additional examples of possible non-protected information may include closed captioning information, trailers, and commentary.

Also for this example embodiment, media processor 260 is capable of receiving the protected data stream, and may include circuitry required to process the audio information without help from software running on processor 110. In this manner, the protected information is not able to be accessed from other system resources.

Although the embodiments discussed above describe audio information retrieved from a CD, other embodiments are possible for other media types and/or content, including, but not limited to, audio and/or video information contained on DVD, Blu Ray disks, HD DVD, compact flash media, SD flash, zip disks, etc. Further, although media processor 260 is described above as including audio processing circuitry, other embodiments may include graphics and/or video processing circuitry and/or audio processing circuitry. For example, in one embodiment, media processor 260 may include circuitry capable of decoding and processing DVD video content without assistance from software running on processor 110. Again, in this manner protected information is kept secure from other computing platform resources.

As used herein, the term "protected data path" is meant to denote a data path to a media processor that is not accessible by application programs, operating systems, device drivers, and/or other software agents. The specific examples of protected data paths described herein are merely examples, and the scope of the claimed subject matter is not limited in these respects.

Further, although the example embodiments described above disclose the use of a single protected data path, such as protected data path 245, other embodiments may comprise more than one protected data path. Alternatively, a single protected data path may be shared among various components. For example, a computing platform may comprise both audio processing circuitry and video processing circuitry, and one or more protected data paths may be utilized to transfer protected data from one or more media reading devices and/or controllers to the audio and/or video processing circuitry. Of course, these are merely examples of possible embodiments, and the scope of the claimed subject matter is not limited in these respects.

Figure 3:
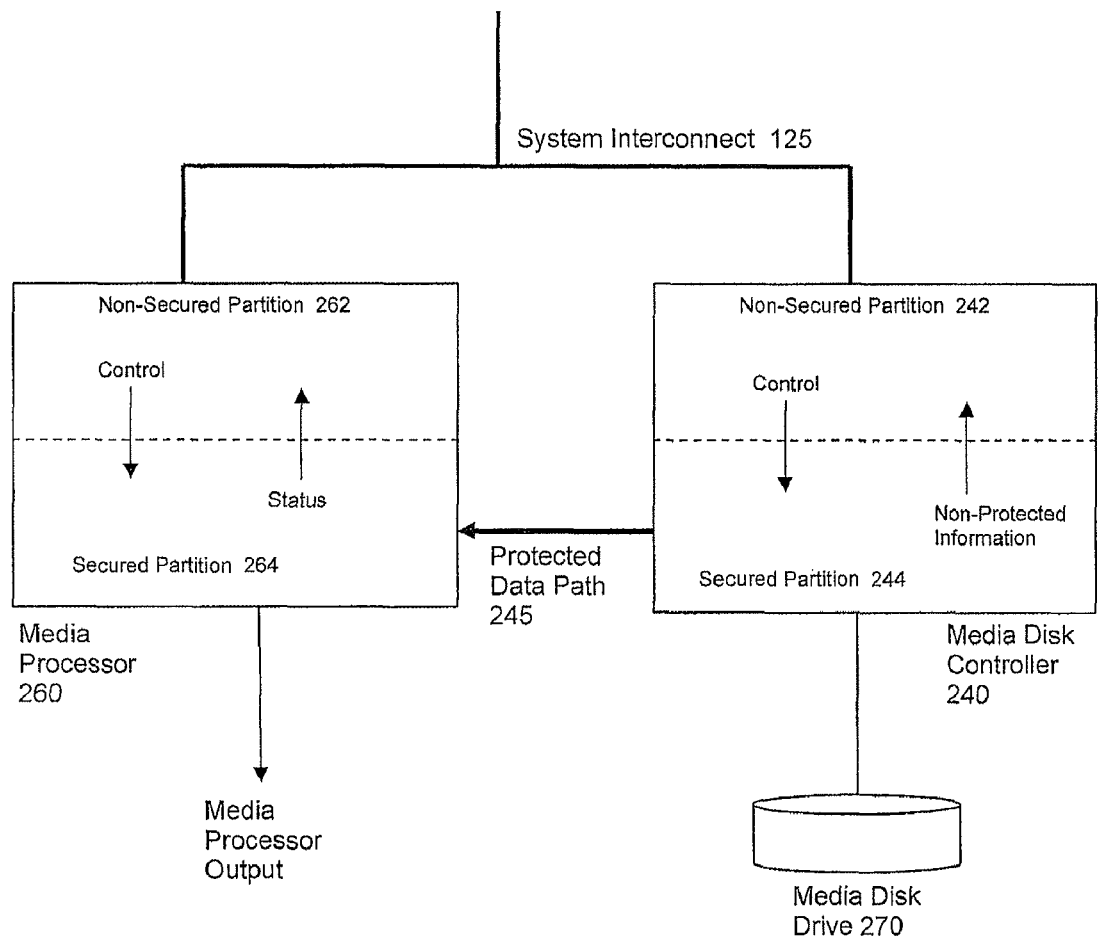
FIG. 3 is a block diagram of example embodiments of a media processor and a media disk controller coupled via an example embodiment of a protected data path.

FIG. 3 is a block diagram of example embodiments of media processor 260 and media disk controller 240 coupled via protected data path 245. For this example, media processor 260 may be logically organized into a non-secured partition 262 and a secured partition 264. Similarly, media disk controller 240 may be logically organized into a non-secured partition 242 and a secured partition 244.

For this embodiment, digital objects may be received from media disk drive 270 at secured partition 244. Non-protected information from the digital object may be transferred to non-secured partition 242, and may also be forwarded to system interconnect 125. Protected information is prevented from crossing from secured partition 244 to non-secured partition 242. Further, for an embodiment control information may be delivered to secured partition 244 from non-secured partition 242. For an embodiment, the control information may comprise commands or other information related to the playing of audio and/or video content. For example, commands to play, stop, pause, fast forward, rewind, etc., may be included in the control information, as well as possibly brightness, contrast, color balance, etc. Of course, these are merely examples of control information that may be delivered to secure partition 244, and the scope of the claimed subject matter is not limited in this respect. Control information of the same and/or different types may be delivered to secured partition 264, although, again, the scope of the claimed subject matter is not limited in this respect. For media processor 260, status information related to the playing of audio and/or video content may be transferred from secured partition 264 to non-secured partition 262. Also, control information may be delivered to secured partition 264 from an operating system window manager to enable proper placement of video data on a computer screen.

Protected data path 245 for this example couples secured partition 244 to secured partition 264. Protected information may be transferred from secured partition 244 to secured partition 264 via protected data path 245. In this manner, for this example embodiment, the protected information is never exposed to system interconnect 125.

Figure 4:
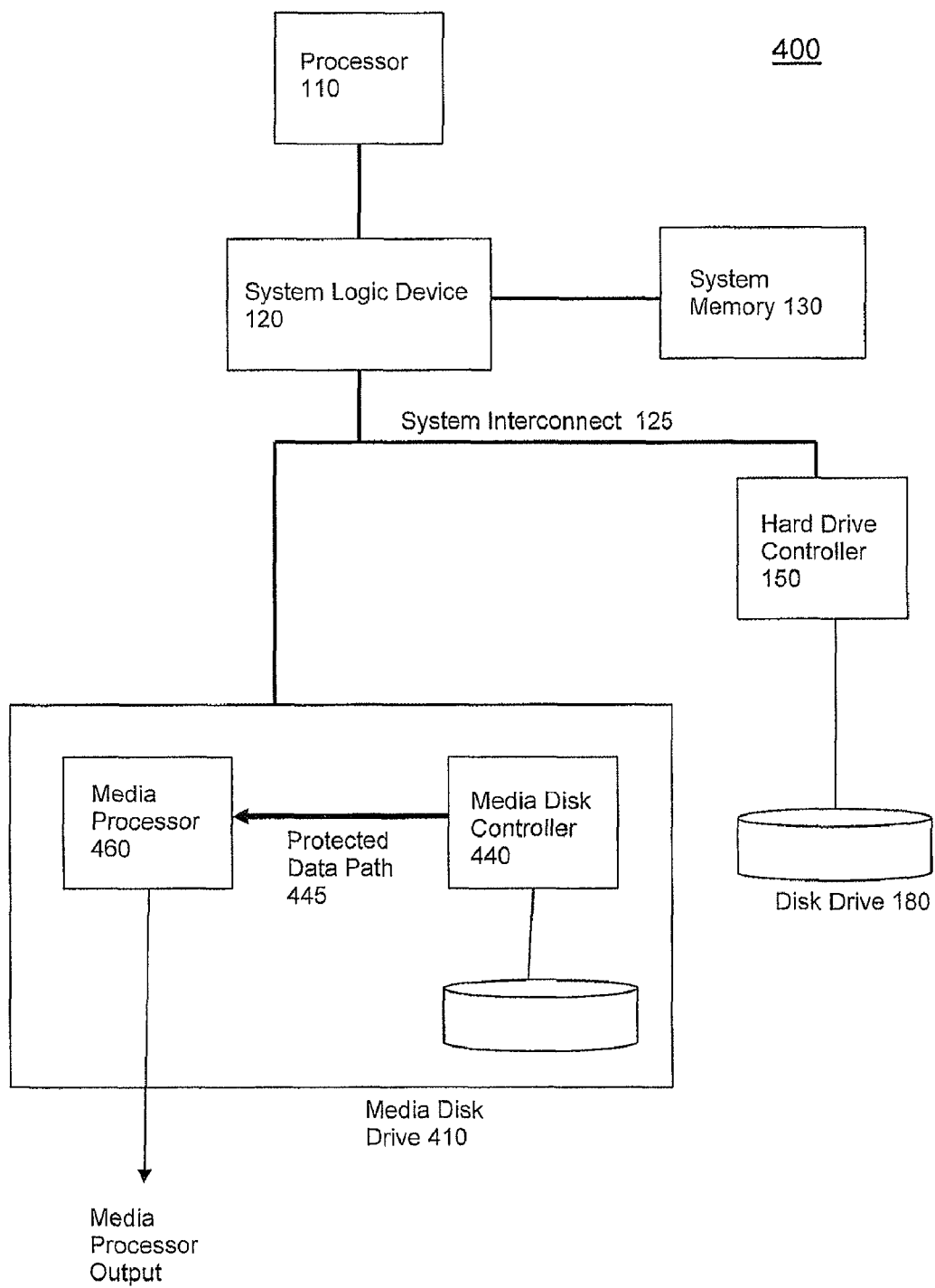
FIG. 4 is a block diagram of an example embodiment of a computing platform comprising an example embodiment of an integrated media processor and media disk controller.

FIG. 4 is a block diagram of an example embodiment of a computing platform 400 comprising an example embodiment of a media processor 460 and a media disk controller 440 integrated into a media disk drive 410. Media processor 460 and media controller 440 may perform similar operations and may include similar features as the media processors and controllers described above. However, in contrast to the embodiments described above, for this example embodiment the audio and/or video processing is performed within media disk drive 410. Media disk drive 410 may comprise an internal protected data path 445 coupling media disk controller 440 and media processor 460.

Media disk drive 410 for an embodiment may comprise all of the circuitry required to process audio and/or video and/or other types of information and to produce a media processor output. For example, in the case of an audio CD, media disk drive 410 may comprise the circuitry required to produce an analog audio signal at the media processor output without requiring help from a program executed by processor 110.

Also, although media disk drive 410 is shown in FIG. 4 as part of computing platform 400, other embodiments are possible where media disk drive 410 is capable of operating as a stand-alone device.

Although the example embodiments described above include separate components for audio and/or video processing and disk read operations, exposed wires and/or pins may be eliminated by performing the audio and/or video disk read operations within the same chip package.

Figure 5:
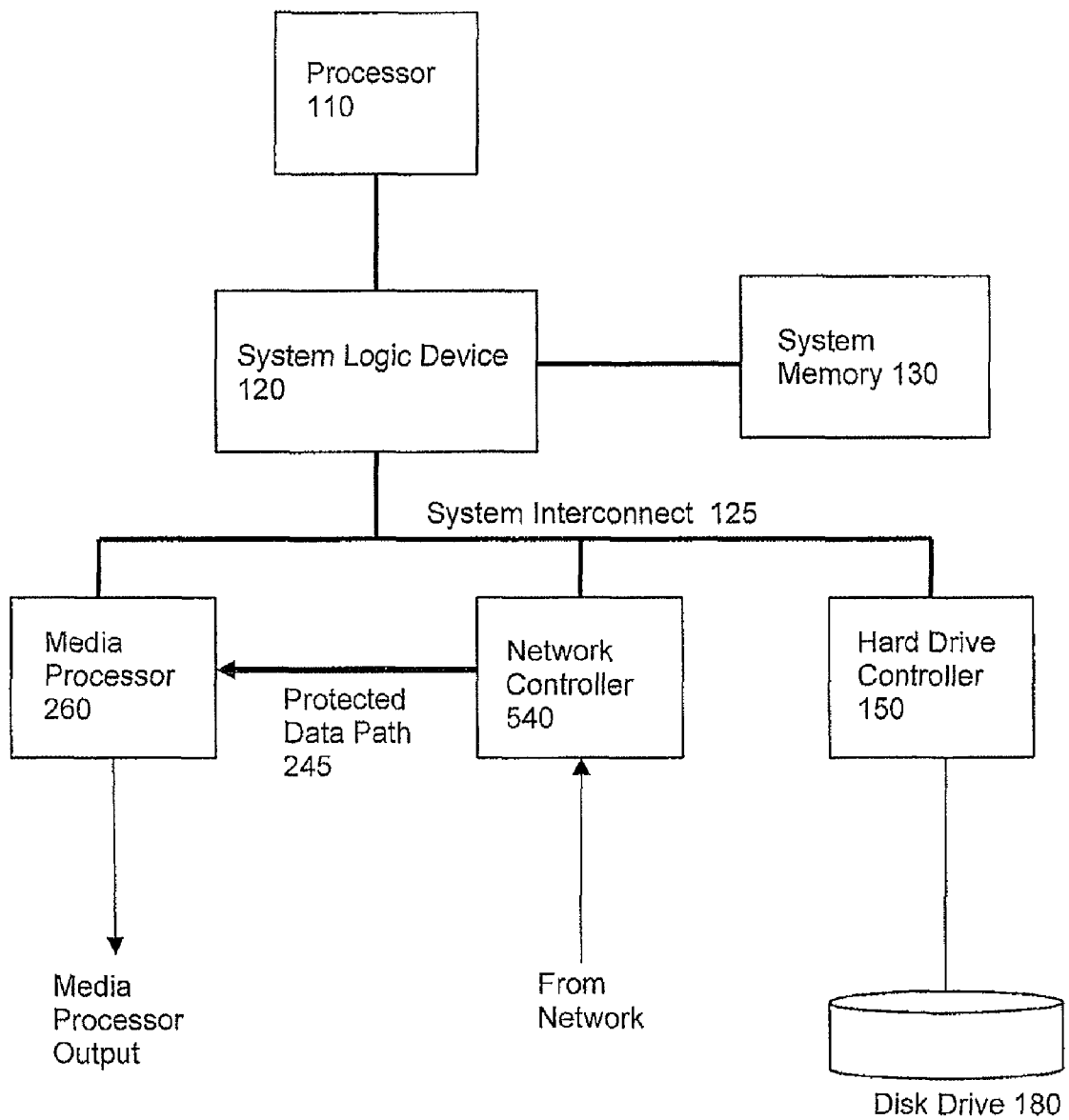
FIG. 5 is a block diagram depicting an example embodiment of a computing platform comprising an example embodiment of a network controller coupled to a media processor via an example embodiment of a protected data path.

FIG. 5 is a block diagram depicting an example embodiment of a computing platform 500 comprising an example embodiment of a network controller 540 coupled to media processor 260 via protected data path 245. Computing platform 500 is similar in many respects to example computing platform 200 described above. However, for this example media content may be received from a network at network controller 540. Network controller may provide connectivity to any of a number of types of networks, including the Internet. Network controller 540 may also provide wireless connectivity to one or more networks for an embodiment.

For this example embodiment, if a digital object including protected information is received from the network, the protected information is transmitted directly to media processor 260 rather than delivering it to other system resources over system interconnect 125. Media processor may render the protected information in order to provide an output, and may perform the rendering without exposing the protected information to other system resources, as described in connection with other embodiments above. As used herein, the term "protected" information is meant to include digital objects that may comprise copyrighted information. The protected information may or may not be encrypted.

Figure 6:
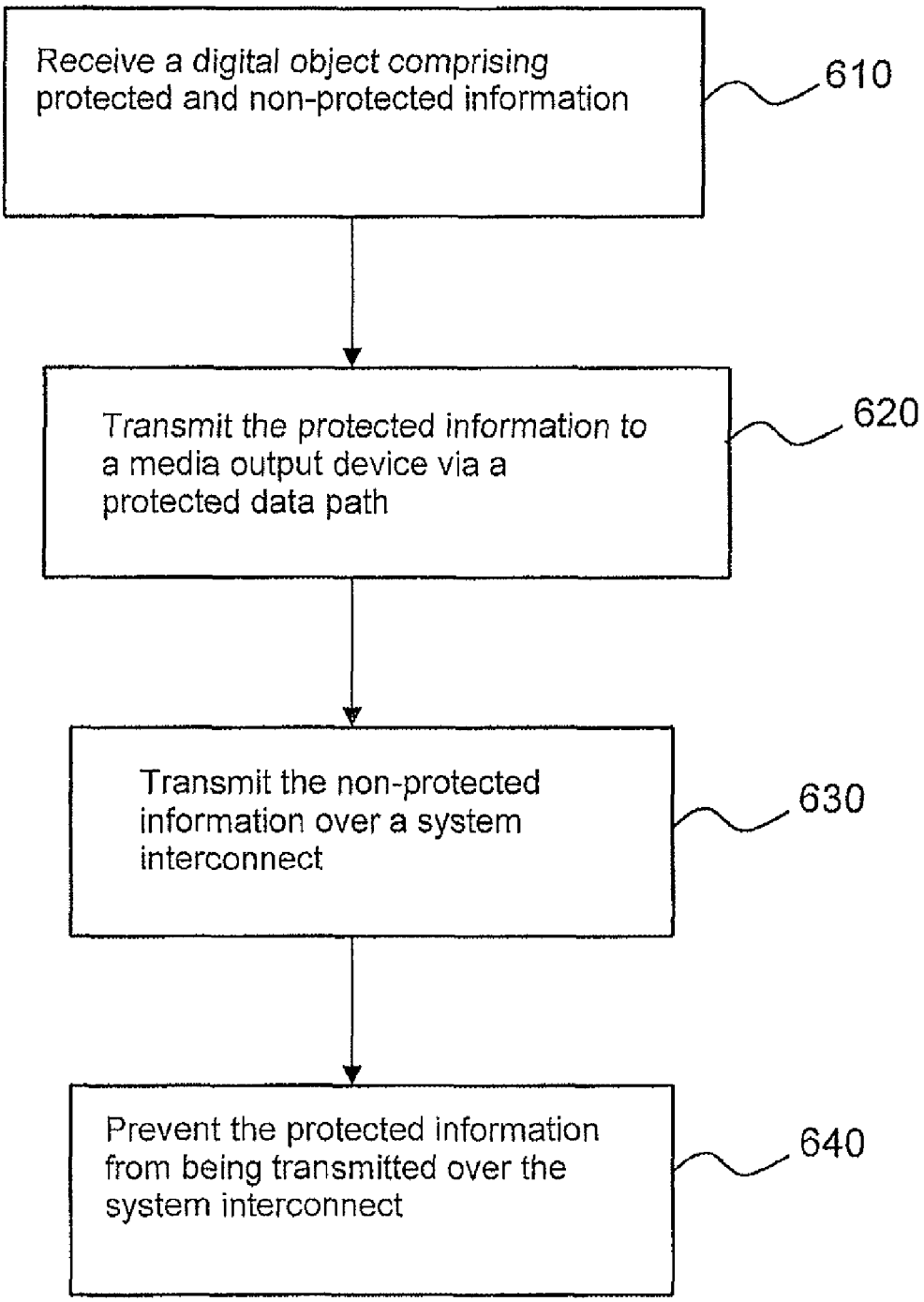
FIG. 6 is a flow diagram of an example embodiment of a method for transmitting protected media content to a media output device via a protected data path.

FIG. 6 is a flow diagram of an example embodiment of a method for transmitting protected media content to a media output device via a protected data path. At block 610, a digital object comprising protected and non-protected information is received. At block 620, the protected information is transmitted to a media output device via a protected data path. Non-protected information is transmitted over a system interconnect at block 630, and at block 640 the protected information is prevented from being transmitted over the system interconnect. The functions described in connection with the example embodiment of FIG. 6 may be implemented in accordance with one or more embodiments described above, although the scope of the claimed subject matter is not limited in this respect. Further, an embodiment in accordance with claimed subject matter may include all, more than all or less than all of blocks 610-640. Furthermore, the order of blocks 610-640 is merely one example order, and the scope of the claimed subject matter is not limited in this respect.

In order to help ensure that a computing platform has properly implemented a protected data path embodiment, perhaps an embodiment such as one disclosed above, a validation process may be employed to verify the implementation. The scope of claimed subject matter is not limited to validation of data path embodiments discussed above. Rather, validation embodiments described herein may be utilized for any of a wide range of computing platforms including, but not limited to, the protected data path embodiments described above. Validation embodiments may comprise analyzing all of the possible paths a protected digital object may take from a media disk drive or other digital object input device to any other device in the computing platform. If that analysis shows that a central processing unit (CPU) and/or other processor that may be used to copy the digital object may be capable of reading the digital object, the computing platform is said to fail the validation process. On the other hand, if the analysis shows that the CPU and any other processor that may be used to copy the digital object can never be exposed to the digital object, the computing platform may be said to pass the validation process.

Figure 7:
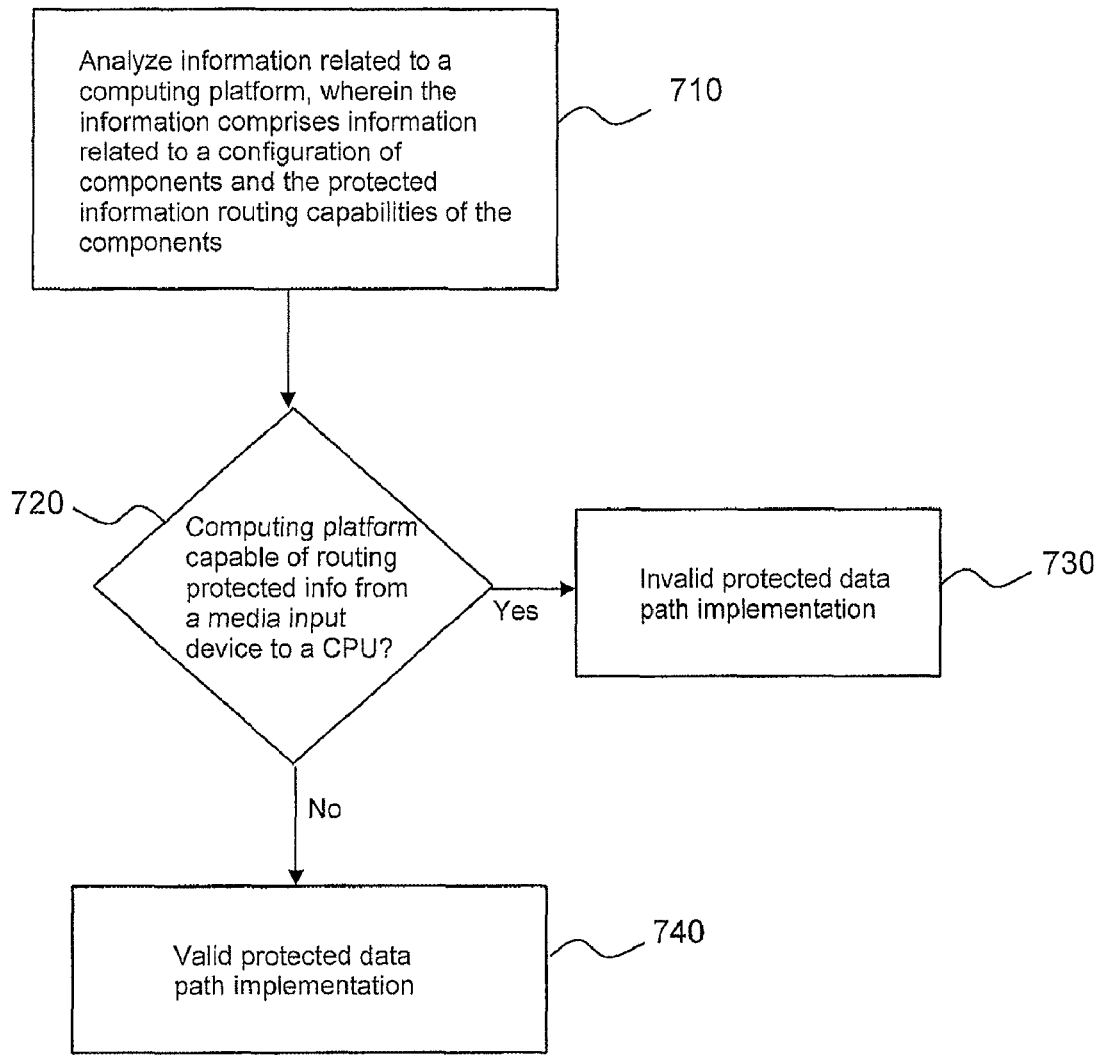
FIG. 7 is a flow diagram of an example embodiment of a method for validating a protected data path.

FIG. 7 is a block diagram depicting an example embodiment of a method for validating a computing platform implementing a protected data path. At 710, information related to a computing platform may be analyzed, wherein the information comprises information related to a configuration of components and the protected information routing capabilities of the components. At 720, a determination may be made as to whether the computing platform is capable of routing protected information received from a media input device to a central processing unit. If a determination is made that the computing platform is not capable of routing protected information to a central processing unit, at 740 an indication may be made that the protected data path implementation is validated. If a determination is made that the computing platform is capable of routing protected information to the central processing unit, at 730 an indication may be made that the protected data path implementation is not validated. An embodiment in accordance with claimed subject matter may include all, more than all or less than all of blocks 710-740. Furthermore, the order of blocks 710-740 is merely one example order, and the scope of claimed subject matter is not limited in this respect.

An embodiment of a procedure for validating a protected data path implementation may comprise creating a net list for the computing platform to be tested. The net list may include a listing of all devices and/or significant functional units in the computing platform. For each device or functional unit, a list of pins that may carry data are listed. The net list may also comprise a listing of each net between the pins. For the example computing platform of FIG. 2 (computing platform 200), the significant devices/functional units may comprise media disk controller 240, media processor 260, hard drive controller 150, system logic device 120, system memory 130, and processor 110. For the examples described herein, only a single data pin for each interface is discussed in order to more clearly describe the example embodiments of the validation procedure. Of course, for other embodiments other numbers of data pins may be utilized.

For this example, the net list may resemble the following:
Functional Units
1. Processor
a. processor bus pin
2. System Logic Device
a. processor bus pin
b. memory bus pin
c. system interconnect pin
3. System Memory
a. memory bus pin
4. Media Processor
a. system interconnect pin
b. media processor output pin
c. protected data path pin
5. Media Disk Controller
a. system interconnect pin
b. protected data path pin
c. media disk drive pin
6. Hard Drive Controller
a. system interconnect pin
b. disk drive pin
Nets
1. Processor Bus
a. processor processor bus pin
b. system logic device processor bus pin
2. Memory Bus
a. system memory memory bus pin
b. system logic device memory bus pin
3. System Interconnect
a. system logic device system interconnect pin
b. media processor system interconnect pin
c. media disk controller system interconnect pin
d. hard drive controller system interconnect pin
4. Protected Data Path
a. media processor protected data path pin
b. media disk controller protected data path pin
5. Disk Drive Interconnect
a. media disk controller disk drive interconnect pin
b. media disk drive disk drive interconnect pin
6. Hard Drive Interconnect
a. hard drive controller hard drive interconnect pin
b. disk drive disk drive interconnect pin In addition to the net list, bridge tables may be created for each of the devices/functional units. The bridge table for a particular device/functional unit may describe how protected information is allowed to flow between the pins of that device/functional unit. For the examples shown below, each input pin for a device is shown as rows, and the output pins are shown as columns. An "X" in the table indicates that data is allowed to flow from the input pin to the output pin. The bridge table may also include special rules for handling protected data. Special rules may be considered to be design constraints placed on a particular device that must be enforced by the device manufacturer in order to help ensure a proper implementation of a protected data path computing platform.

Below are example bridge tables for some of the devices in the current example of computing platform 200:

TABLE 1

Bridge Table for Media Disk Controller (non compliant)

| From | To | | | |
|---|---|---|---|---|
| | System Interconnect Pin | Protected Data Path Pin | Disk Drive Interconnect Pin | Special Rules |
| System Interconnect Pin | X | | X | |
| Protected Data Path Pin | | X | | |
| Disk Drive Interconnect Pin | X | X | X | |

TABLE 2

Bridge Table for Media Processor

| From | To | | | |
|---|---|---|---|---|
| | System Interconnect Pin | Protected Data Path Pin | Media Processor Output Pin | Special Rules |
| System Interconnect Pin | X | | X | |
| Protected Data Path Pin | | X | X | |
| Media Processor Output Pin | | | | |

TABLE 3

Bridge Table for System Logic Device

| From | To | | | |
|---|---|---|---|---|
| | Processor Bus Pin | Memory Bus Pin | System Interconnect Pin | Special Rules |
| Processor Bus Pin | X | X | X | |
| Memory Bus Pin | X | X | X | |
| System Interconnect Pin | X | X | X | |

Using the net list and the bridge tables, the validation procedure may comprise starting at the media disk drive and analyzing all of the possible paths that a digital object may travel within computing platform 200. For this example, the procedure begins at the media disk drive because that is the source for the digital object. For this example, media disk drive 270 is only connected to media disk controller 240. For this example, for purposes of illustrating an improperly implemented protected data path, media disk controller 240 is assumed to not implement any special rules for handling copyrighted data. Once received at media disk controller 240, a digital object may take a couple of different routes. Bridge table 1 indicates that the digital object may be routed to protected data path 245 and/or to system interconnect 125. As indicated by the net list, media disk drive 270 is coupled to media processor 260 via protected data path 245 and is coupled to system logic device 120 and hard drive controller 150 via system interconnect 125. System interconnect 125 also provides an alternate path to media processor 260. For this example embodiment, a particular bridge table entry is not used more than once in order to avoid circular referencing.

So far in this example, the digital object may be capable of being routed to media processor 260, system logic device 120, and hard drive controller 150. Further analysis may be conducted to determine where the digital object may be routed from each of those devices. For this example, system logic device 120 is capable of routing the digital object to processor 110. Thus, for this example, using Table 1 for the media disk controller, copyrighted information comprised in the digital object may be vulnerable to copying and/or modification and/or subject to other unauthorized processing. Thus, for this example, computing platform 200 fails the validation procedure, indicating that the protected data path has not been properly implemented.

The following is a table for media disk controller 240 implementing a special rule for routing copyrighted information:

TABLE 4

Bridge Table for Media Disk Controller (compliant)

| From | To | | | |
|---|---|---|---|---|
| | System Interconnect Pin | Protected Data Path Pin | Disk Drive Interconnect Pin | Special Rules |
| System Interconnect Pin | X | | X | |
| Protected Data Path Pin | | X | | |
| Disk Drive Interconnect Pin | X | X | X | No protected information to system interconnect pin |

For this example, media disk controller 240 implements a special rule for handling digital objects with copyrighted information. With this special rule, no protected information is routed from the media disk drive to system interconnect 125. In this manner, the protected information is not routed to system logic device 120, and is also therefore not routed to processor 110. Therefore, following the analysis procedure outlined above, computing platform 200 passes the validation procedure because processor 110 never has access to the protected information.

For this example, it is assumed that media processor 260 does not have the ability to route information from the media output pin or the protected data path pin to the system interconnect pin. If it did have this ability, another special rule may be implemented to prevent protected information from being routed to system interconnect 125.

In order to help ensure proper implementation of a protected data path according to the example embodiments described herein, designers/manufacturers of media disk controller 240 must design and implement the device to enforce the special rule against routing protected information to system interconnect 125. Any embedded software/firmware utilized by media disk controller 240 also should enforce the special rule. Also, any such software/firmware should be made non-field programmable in order to prevent altering of the implementation of the special rule.

Proper implementation of media disk controller 240 may be checked using an analysis similar to that performed above for the system as a whole. Each device may be thought of as comprising a number of functional units, each with inputs and outputs that may be analyzed to determine where information may be routed. Thus, net lists and bridge tables may be created in order to analyze the implementation of individual devices, as well as systems as a whole.

Figure 8:
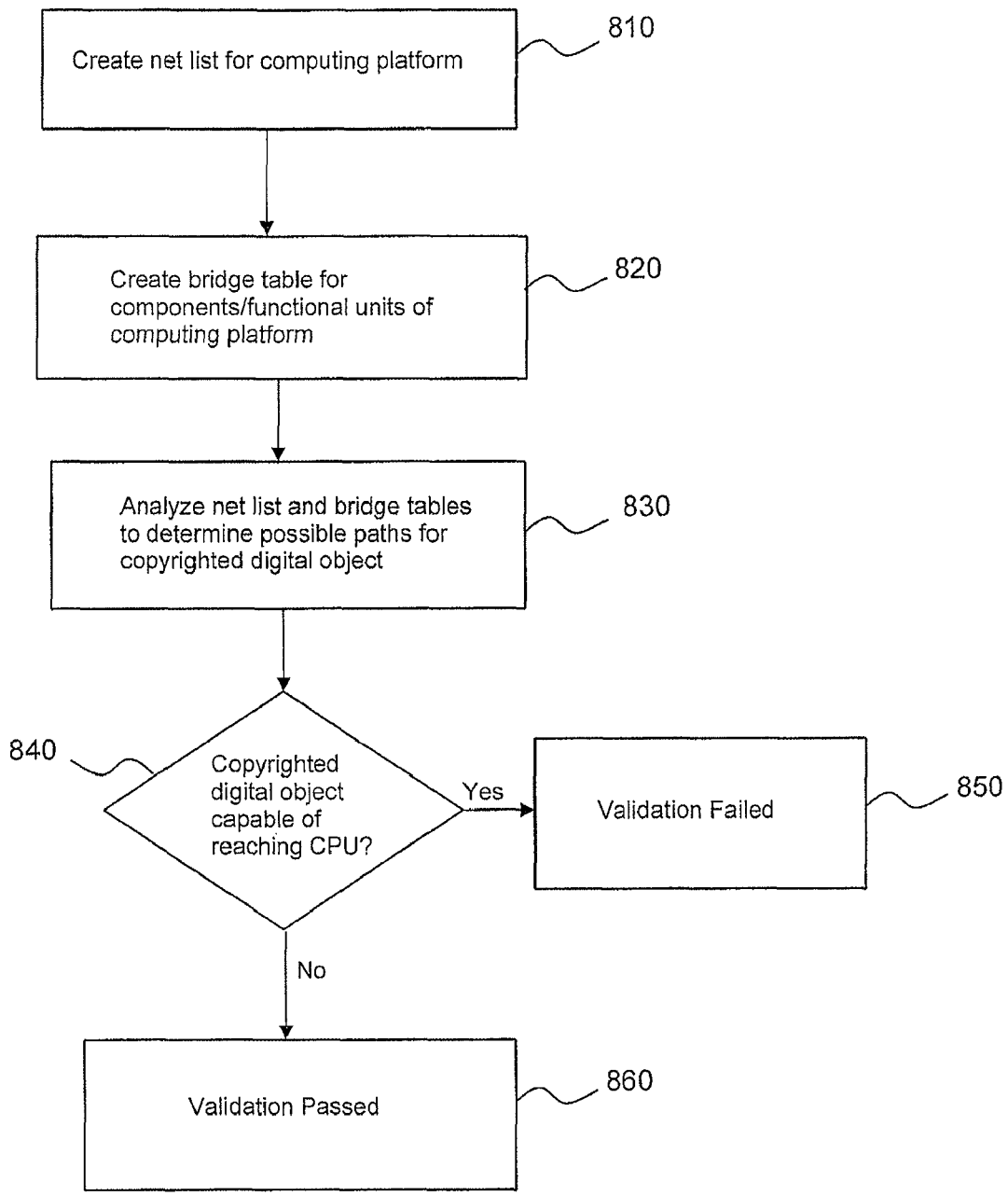
FIG. 8 is a flow diagram of an additional example embodiment of a method for validating a protected data path.

FIG. 8 is a flow diagram of an example embodiment of a method for validating a protected data path. This example may be similar to that discussed above. At 810, a net list for a computing platform may be created, and at 820 bridge tables for various components and/or functional units of the computing platform may be created. The net list and bridge tables may be analyzed at 830 to determine possible paths for a copyrighted digital object. As indicated at 840, if the analysis indicates that the copyrighted digital object is capable of being routed to the CPU (or rather that the computing platform is capable of routing the copyrighted digital object to the CPU), validation fails at 850. If the analysis shows that the copyrighted digital object is not capable of being routed to the CPU (the system has no capability to route the copyrighted digital object to the CPU), the validation process passes at 860. The functions described in connection with the example embodiment of FIG. 8 may be implemented in accordance with one or more embodiments described herein, although the scope of claimed subject matter is not limited in this respect.

Further, an embodiment in accordance with claimed subject matter may include all, more than all or less than all of blocks 810-860. Furthermore, the order of blocks 810-860 is merely one example order, and the scope of claimed subject matter is not limited in this respect.

Figure 9A:
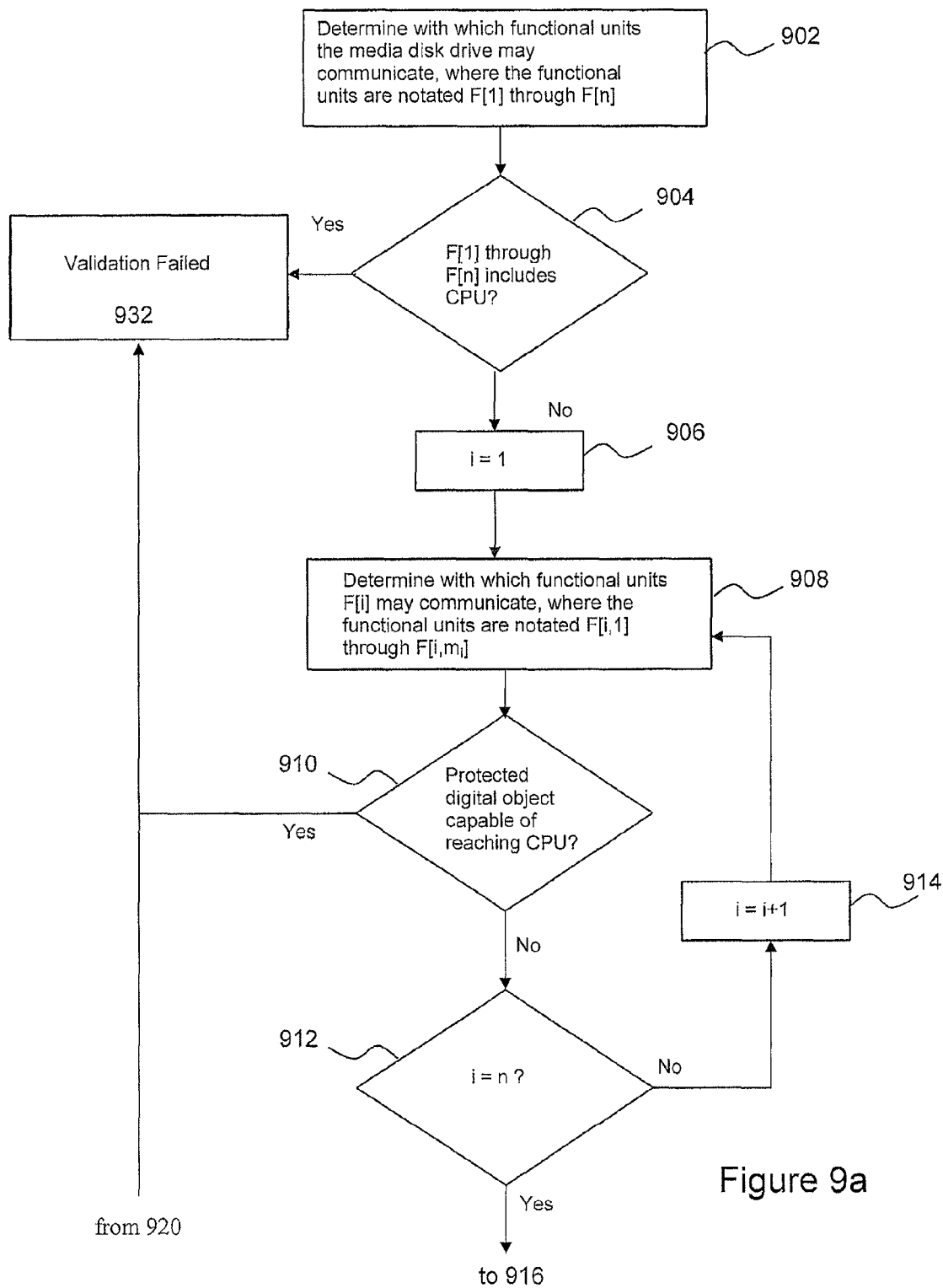
FIGS. 9a and 9b depict a flow diagram of an example embodiment of a method for recursive validation of a protected data path.
Figure 9B:
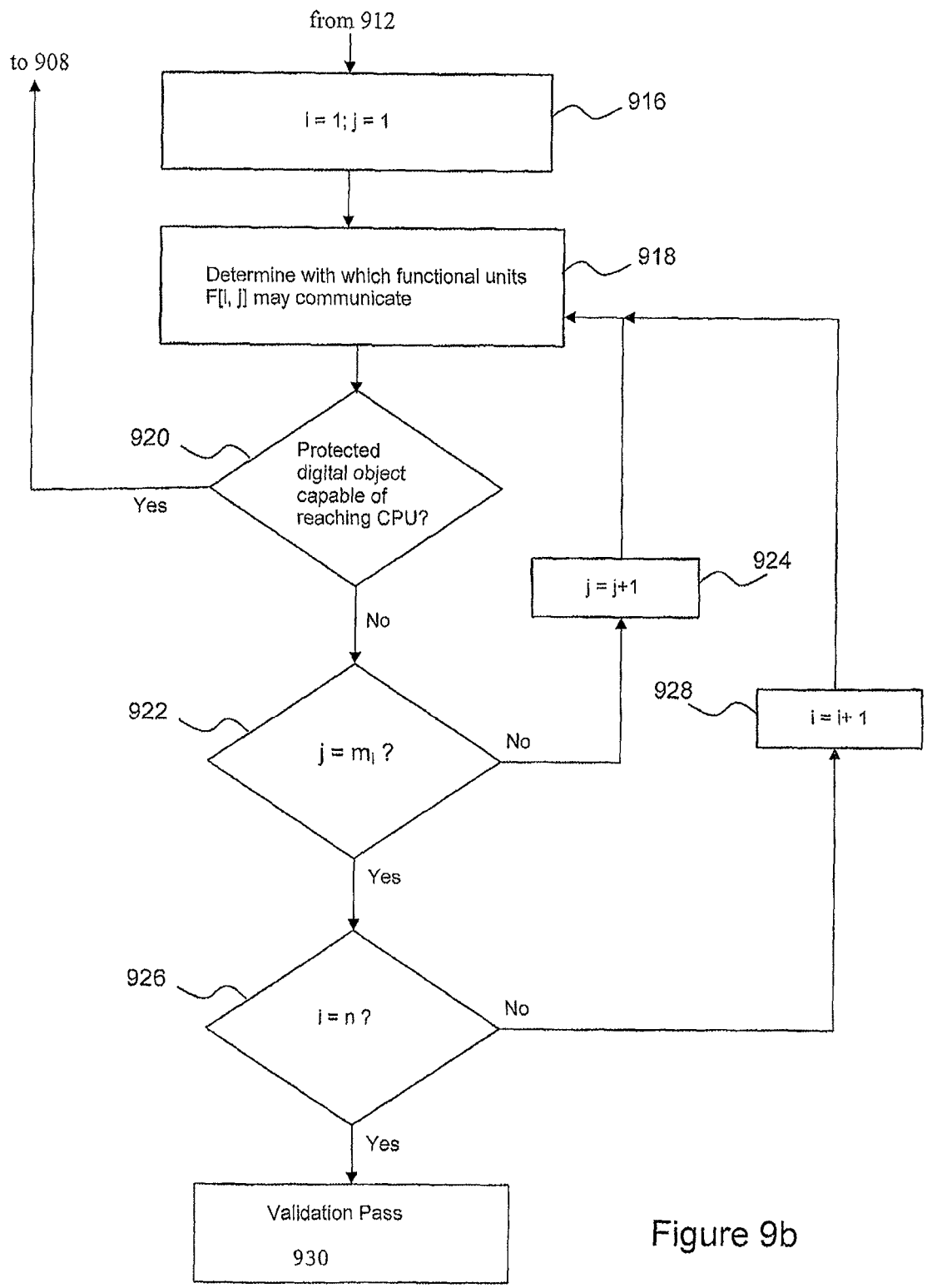

FIGS. 9a and 9b collectively depict a flow diagram of an example embodiment of a method for recursive validation of a protected data path. For this example, as in the example above, the analysis is assumed to begin at the media disk drive. However, a disk drive is merely one type of input device that may deliver protected information to a computing platform. Therefore, although this example discusses a media disk drive, other embodiments may include other types of input devices, including, for example, network controllers.

At 902, an analysis may be made to determine with which functional units (devices) the media disk drive may communicate. These functional units may be notated F[1] through F[n] in the general case, where the variable "n" denotes the total number of functional units with which the media disk drive may communicate protected information. For this example utilizing computing platform 200, there is a single functional unit capable of receiving information from the media disk drive, the media disk drive controller. At 904, the list of functional units F[1] through F[n] is analyzed to determine whether the CPU is one of the functional units. As indicated at 932, if one of the functional units is indeed the CPU, the validation fails. Again, for this example, there is only a single functional unit with which the media disk drive may communicate, and that functional unit is not the CPU, so the procedure moves to block 906 where a variable "i" is set to 1.

At 908, an analysis is performed to determine with which functional units the $i^{th}$ functional unit (F[i]) found at block 902 may route protected information. For this example, functional unit F[1] is the media disk controller, so the analysis at block 808 for this iteration determines with which functional units the media disk controller may route protected information. These functional units may be notated F[I, 1] through F[i,$m_i$]. The variable $m_i$ may represent a different variable for each iteration of the loop formed by blocks 908 through 914, and may represent the total number of functional units to which F[i] may route protected data. For this example using computing platform 200, media disk controller 240 may route data in general to several functional units, as indicated above by the net list and by table 4. Table 4, however, indicates that a special rule is implemented for the media disk controller, whereby protected information may only be routed from the media disk drive to protected data path 245. Therefore, for this example, at block 908, a single functional unit F[1, 1] is determined to be capable of receiving protected information from media disk controller 240. Because this functional unit is not the CPU, but is rather the media output processor, block 910 indicates that the procedure moves to 912. If at block 910 it is determined that one of the functional units observed in 908 in indeed the CPU, processing would proceed to block 932 where an indication is made that the validation process failed.

At block 912, a determination may be made as to whether the variable "i" is equal to "n". If so, processing moves to block 916, and if not, the variable "i" is incremented at 914 and the procedure returns to 908. For this example, i is equal to n, so the procedure moves along to 916.

At 912, i is set to "1", and a variable "j" is set also set to "1". At block 918, a determination may be made as to which other functional units functional unit F[i,j] may route protected information. In this example, F[1,1] is the media output processor, which is only able to route the protected information to the media output. Therefore, at 920, the determination is made that the F[1,1] is not capable of routing protected information to the CPU, and processing moves to 922. If at 920 a determination is made that one of the functional units observed at block 918 is indeed the CPU, processing moves to 932 where an indication is given that the computing platform failed the protected data path validation procedure.

For this example, the variable $m_1$ has the value of 1, and because j is also one, processing moves to 926 from block 922. If there are additional functional units to analyze, as would be indicated by j not equaling $m_i$, j is incremented at 924 and processing returns to 918. Similarly, if there remains additional functional units from block 908 to be analyzed, as would be indicated by i not equaling n, i is incremented at 928 and processing returns to 918. If during any of the iterations of the loops formed by block 918 through 928 a determination is made that the protected information may reach the CPU, the validation procedure fails. On the other hand, if once all of the functional units have been analyzed the CPU is never observed to have access to the protected information, the validation procedure passes, as indicated at 930.

For this example, because media processor 260 is only capable of routing protected information to the media processor output, the CPU never has the opportunity to receive the protected information, and the protected data path implementation is validated. On the other hand, if media disk controller 240 is incorrectly implemented (does not implement a special rule preventing the routing of protected information to system interconnect 125), the analysis performed by the example procedure of FIGS. 9a and 9b would have determined that system logic device 120 is capable of routing protected information to CPU 110, and the protected data path implementation would fail the validation process.

The above example shows several levels of analysis that may be sufficient to analyze example computing platform 200. However, the above procedure may be expanded to implement as many levels of analysis as are desirable to analyze different computing platform configurations. Also, as can be seen in the example procedure above, the analysis may be performed in a recursive fashion. The functions described in connection with the example embodiment of FIGS. 9a and 9b may be implemented in accordance with one or more embodiments described herein, although the scope of claimed subject matter is not limited in this respect. Further, an embodiment in accordance with claimed subject matter may include all, more than all or less than all of blocks 902-932. Furthermore, the order of blocks 902-932 is merely an example order, and the scope of claimed subject matter is not limited in this respect.

Further, the recursive validation embodiments described above in connection with FIGS. 9a and 9b may be utilized to test individual components of a computing platform as well as testing the computing platform on the whole. That is, individual components of a computing platform may be viewed as sub-systems, and the sub-systems may be tested for proper protected data path implementations in a manner similar to the validation embodiments described above where the computing platform as a whole may be tested.

Computing platform 100, as shown in FIG. 1 may be utilized to embody tangibly a computer program and/or graphical user interface by providing hardware components on which the computer program and/or graphical user interface may be executed. Computing platform 100 may be utilized to embody tangibly all or a portion of the validation process embodiments described above in connection with FIGS. 7, 8, 9a, and 9b and/or other procedures disclosed herein. Such a procedure, computer program and/or machine readable instructions may be stored tangibly on a computer and/or machine readable storage medium such as a compact disk (CD), digital versatile disk (DVD), flash memory device, hard disk drive (HDD), and so on. The computing platform that is undergoing validation testing according to embodiments described herein may be referred to as a "test computing platform".

In the preceding description, various aspects of claimed subject matter have been described. For purposes of explanation, systems and configurations were set forth to provide a thorough understanding of claimed subject matter. However, these are merely example illustrations of the above concepts wherein other illustrations may apply as well, and the scope of the claimed subject matter is not limited in these respects. It should be apparent to one skilled in the art having the benefit of this disclosure that claimed subject matter may be practiced without specific details. In other instances, well-known features were omitted and/or simplified so as to not obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method, comprising:
    analyzing, by a computer system, information related to a computing platform, wherein the information related to the computing platform comprises a net list for the computing platform, wherein the net list includes a list of components, functional units, or combinations thereof in the computing platform, a list of pins configured to carry data, and a list of nets between the pins, wherein the information related to the computing platform further comprises a bridge table corresponding to at least one of the components, functional units, or combinations thereof, and wherein the bridge table includes a rule for handling protected information;
    determining, by the computer system and based, at least in part, on the net list and the bridge table, whether the computing platform is capable of routing protected information received from a media input device to a central processing unit; and
    if the computing platform is determined to be capable of routing the protected information to the central processing unit, indicating an invalid protected data path implementation.

2. The method of claim 1, wherein the computing platform comprises a plurality of components and wherein the plurality of components includes the media input device.

3. The method of claim 2, wherein one or more of the plurality of components comprise one or more functional units, and wherein the net list comprises a listing of at least some of the one or more functional units.

4. The method of claim 1, wherein said information related to the computing platform comprises a plurality of bridge tables corresponding to the components, functional units, or combinations thereof, including the bridge table, wherein the plurality of bridge tables comprise information describing how protected information is allowed to flow between ones of the pins configured to carry data.

5. The method of claim 4, wherein the information describing how protected information is allowed to flow between ones of the pins configured to carry data comprises information related to the rule for handling protected information.

6. The method of claim 1, wherein the bridge table corresponds to the media input device, and wherein said determining whether the computing platform is capable of routing protected information received from a media input device to a central processing unit comprises for a first one of the components determining whether the media input device is capable of transferring protected information to the central processing unit according to the information in the net list and the bridge table corresponding to the media input device.

7. The method of claim 6, wherein said determining whether the computing platform is capable of routing protected information received from the media input device to a central processing unit further comprises if the media input device is not capable of transferring protected information to the central processing unit, determining whether any component capable of receiving protected information from the media input device is capable of transferring protected information to the central processing unit.

8. The method of claim 4, wherein said determining whether the computing platform is capable of routing protected information received from the media input device to a central processing unit further comprises recursively analyzing the information in the net list and the plurality of bridge tables to determine whether there exists a path for protected information from the media input device to the central processing unit.

9. An article, comprising: a non-transitory storage medium having stored thereon instructions that, if executed, direct a computing platform to:
    analyze information related to a test computing platform, wherein the information comprises a net list for the computing platform, wherein the net list includes a list of components in the computing platform, a list of pins configured to carry data, and a list of nets between the pins, wherein the information related to the test computing platform further comprises a bridge table corresponding to at least one of the components, and wherein the bridge table includes a rule for handling protected information;
    determine, based, at least in part, on the net list and the bridge table, whether the test computing platform is capable of routing protected information received from a media input device to a central processing unit; and
    if the test computing platform is determined to be capable of routing the protected information to the central processing unit, indicate an invalid protected data path implementation.

10. The article of claim 9, wherein the components in the computing platform comprise the media input device.

11. The article of claim 10, wherein one or more of the components in the computing platform comprise one or more functional units, and wherein the net list further includes a listing of at least some of the one or more functional units.

12. The article of claim 10, wherein said information related to the test computing platform comprises a plurality of bridge tables corresponding to the components, including the bridge table, wherein the plurality of bridge tables comprise information describing how protected information is allowed to flow between ones of the pins configured to carry data.

13. The article of claim 12, wherein the information describing how protected information is allowed to flow between ones of the pins configured to carry data in the bridge tables comprises information related to the rule for handling protected information.

14. The article of claim 10, wherein the bridge table corresponds to the media input device, and wherein said determining whether the test computing platform is capable of routing protected information received from the media input device to the central processing unit comprises for a first of the components determining whether the media input device is capable of transferring protected information to the central processing unit according to the information in the net list and the bridge table.

15. The article of claim 14, wherein said determining whether the test computing platform is capable of routing protected information received from the media input device to the central processing unit further comprises if the media input device is not capable of transferring protected information to the central processing unit, determining whether any component capable of receiving protected information from the media input device is capable of transferring protected information to the central processing unit.

16. The article of claim 12, wherein said determining whether the test computing platform is capable of routing protected information received from the media input device to the central processing unit further comprises recursively analyzing the information in the net list and the plurality of bridge tables to determine whether there exists a path for protected information from the media input device to the central processing unit.

17. An apparatus, comprising:
   means for analyzing information related to a computing platform, wherein the information comprises a net list for the computing platform, wherein the net list includes a list of components in the computing platform, a list of pins configured to carry data, and a list of nets between the pins, wherein the information further comprises a bridge table corresponding to at least one component, and wherein the bridge table includes a rule for handling protected information;
   means for determining based, at least in part, on the net list and the bridge table, whether the computing platform is capable of routing protected information received from a media input device to a central processing unit; and
   means for indicating an invalid protected data path implementation if the computing platform is determined to be capable of routing the protected information to the central processing unit.

18. The apparatus of claim 17, wherein the components in the computing platform comprise the media input device, wherein one or more of the components in the computing platform comprise one or more functional units, and wherein the net list comprises a listing of at least some of the one or more functional units.

19. The apparatus of claim 17, wherein said information related to the computing platform comprises a plurality of bridge tables corresponding to the components, including the bridge table, and wherein the plurality of bridge tables comprise information describing how protected information is allowed to flow between ones of the pins configured to carry data.

20. The apparatus of claim 19, wherein the information describing how protected information is allowed to flow between ones of the pins configured to carry data in the bridge tables comprises information related to the rule for handling protected information.

21. The apparatus of claim 17, wherein the bridge table corresponds to the media input device, and wherein said means for determining whether the computing platform is capable of routing protected information received from the media input device to the central processing unit comprises for a first of the components means for determining whether the media input device is capable of transferring protected information to the central processing unit according to the information in the net list and the bridge table.

22. The apparatus of claim 21, wherein said means for determining whether the computing platform is capable of routing protected information received from the media input device to the central processing unit further comprises means for determining whether any component capable of receiving protected information from the media input device is capable of transferring protected information to the central processing unit if the media input device is not capable of transferring protected information to the central processing unit.

23. The apparatus of claim 19, wherein said means for determining whether the computing platform is capable of routing protected information received from the media input device to the central processing unit further comprises means for recursively analyzing the information in the net list and the plurality of bridge tables to determine whether there exists a path for protected information from the media input device to the central processing unit.

24. The method of claim 1, wherein the bridge table includes information regarding connections to a pin associated with the protected data path.

25. The article of claim 9, wherein the bridge table includes information regarding connections to a pin associated with the protected data path.

26. The apparatus of claim 17, wherein the bridge table includes information regarding connections to a pin associated with the protected data path.

* * * * *